US012246423B2

(12) United States Patent
Yin et al.

(10) Patent No.: US 12,246,423 B2
(45) **Date of Patent: *Mar. 11, 2025**

(54) LOCKING DEVICE FOR ADJUSTING THE NAILING FORCE OF ELECTRIC NAILING GUN

(71) Applicant: Zhejiang Rongpen Air Tools Co., Ltd., Zhejiang (CN)

(72) Inventors: Zhenxing Yin, Zhejiang (CN); Junpeng Wei, Zhejiang (CN); Zhenhui Chen, Zhejiang (CN); Xiaorong Li, Zhejiang (CN); Fazheng Yang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/996,224

(22) PCT Filed: Nov. 2, 2021

(86) PCT No.: PCT/CN2021/128074

§ 371 (c)(1),
(2) Date: Oct. 14, 2022

(87) PCT Pub. No.: WO2023/024258

PCT Pub. Date: Mar. 2, 2023

(65) Prior Publication Data

US 2024/0246213 A1 Jul. 25, 2024

(30) Foreign Application Priority Data

Aug. 23, 2021 (CN) ......................... 202110965115.4

(51) Int. Cl.
*B25C 1/06* (2006.01)

(52) U.S. Cl.
CPC ...................................... *B25C 1/06* (2013.01)

(58) Field of Classification Search
CPC ........................................................ B25C 1/06
See application file for complete search history.

(56) References Cited

U.S. PATENT DOCUMENTS 11,110,578 B2 * 9/2021 Li ........................... B25C 1/047
2020/0238494 A1 * 7/2020 Li ............................. B25C 1/06
(Continued)

FOREIGN PATENT DOCUMENTS

CN 109571373 A * 4/2019 ............... B25C 1/04
CN 109693210 A * 4/2019 ............... B25C 1/06
(Continued)

*Primary Examiner* — Lucas E. A. Palmer

(57) ABSTRACT

A locking device for adjusting the nailing force of an electric nailing gun, comprising a power box, a driving motor provided inside the power box, an upper cylinder configured on the right side of the power box, a lower cylinder located right beneath the upper cylinder. The driving motor is connected with a connecting arm via a reducing mechanism. The end part of the connecting arm is configured with an eccentric spindle. A lower piston is provided inside the lower cylinder. The lower piston is hinged with a piston arm. The piston arm is connected to the eccentric spindle. An upper piston is configured inside the upper cylinder. The center of the left sidewall of the upper piston is configured with a firing pin. The left end of the firing pin sticks out of the upper cylinder.

9 Claims, 9 Drawing Sheets

(56) References Cited

U.S. PATENT DOCUMENTS

| | | | | |
|---|---|---|---|---|
| 2021/0354276 | A1 * | 11/2021 | Zhang | B25C 1/06 |
| 2022/0226977 | A1 * | 7/2022 | Nettleton | B25C 5/13 |
| 2023/0059101 | A1 * | 2/2023 | Jiang | B25C 1/06 |

FOREIGN PATENT DOCUMENTS

| | | | | | |
|---|---|---|---|---|---|
| CN | 111546292 | | * | 8/2020 | B25C 1/06 |
| CN | 111546292 | A | * | 8/2020 | B25C 1/06 |
| WO | WO-2019009078 | A1 | * | 1/2019 | B25C 1/06 |
| WO | WO-2021232519 | A1 | * | 11/2021 | B25C 1/06 |

* cited by examiner

LOCKING DEVICE FOR ADJUSTING THE NAILING FORCE OF ELECTRIC NAILING GUN

BACKGROUND OF INVENTION

1. Field of the Invention

The present invention relates generally to a locking device for adjusting the nailing force of an electric nailing gun.

2. Description of Related Art

During operation of an electric nailing gun, the nail is shot out of the nozzle from inside the nailing channel by the firing pin of the electric nailing gun. When the electric nailing gun is idle, the firing pin is locked up by the locking block of the locking device. When the electric nailing gun is to be used again, the locking device should be released to allow the firing pin to move freely. This unlocking method is inconvenient and may affect the nailing efficiency. In the conventional locking method, the locking block of the locking device is pressed into the notch of the firing pin by the elastic force of a spring. This locking method results in extremely high pressure by the locking block upon the notch of the firing pin. After repeated locking and unlocking, the locking block and the notch will be worn out due to constant collisions, leading to inaccurate location of the firing pin during the locked state, and consequently affecting nailing quality.

During actual use of the electric nailing gun, different positions or different articles may often require different nailing forces. However, the nailing force is determined by the driving motor of the electric nailing gun, which can only generate a constant nailing force. The nailing force cannot be adjusted. In order to change the nailing force, the whole driving motor must be replaced. This is obviously troublesome and costly.

SUMMARY OF THE INVENTION

The present invention provides a locking device that can adjust the nailing force of an electric nail gun, which can not only lock the striker, but also effectively avoid the situation that the locking block continuously collides with the inner wall of the bayonet during the locking process to cause wear, and can also adjust the nailing force according to actual needs.

The technical scheme adopted by the present invention to solve the above-mentioned technical problems is:

a locking device for adjusting the nailing force of an electric nailing gun, comprising a power box, a driving motor provided in the power box, and upper and lower cylinders arranged on a right side of the power box, the lower cylinder located below the upper cylinder, wherein the driving motor is connected with a connecting arm through a reducing mechanism, an end part of the connecting arm is configured with an eccentric spindle, a lower piston is provided inside the lower cylinder, the lower piston is hinged with a piston arm, the piston arm is connected to the eccentric spindle, an upper piston is configured inside the upper cylinder, the center of a left sidewall of the upper piston is configured with a firing pin, a left end of the firing pin sticks out of the upper cylinder, a left side of the upper cylinder is configured with a fixing part located above the power box, one end of the fixing part is connected to the upper cylinder via a first bolt and a second bolt, a rear side of a top surface of the power box is configured with a rotating slot, a bottom of the rotating slot is configured with a rotating hole communicated to an internal space of the power box, a matching rotating bushing is configured the rotating hole, a matching rotating spindle is configured inside the rotating bushing, the lower end of the rotating spindle sticks downward into the power box and is configured with a short rocker, the rotating bushing is sleeved with a torsion spring, one end of the torsion spring is fixed on the short rocker, the other end of the torsion spring is fixed on the inner wall of the power box, the upper end of the rotating spindle is configured with an automatic unlocking device that matches the rotating slot, the right side of the automatic unlocking device is configured with a matching locking block, the sidewall of the firing pin on the side facing the locking block is configured with a notch, the locking block is configured with a locking part matching the notch, the lower end of the second bolt sticks into the internal space of the power box and is hinged with a long rocker, the long rocker is configured with a nailing force adjusting device matching the short rocker.

More preferably, wherein the automatic unlocking device comprises a driving wheel configured on the upper end of the rotating spindle, the driving wheel being located inside the rotating slot; the top surface of the power box is configured with a positioning slot communicated with the rotating slot, the positioning slot being located on the right side of the rotating slot; a locking seat is configured inside the positioning slot, the locking seat being fixed inside the positioning slot via a third bolt; the top surface of the locking seat is configured with a rotating boss; the locking block is sleeved outside the rotating boss via the movement hole configured at its center; the left bottom surface of the locking block is configured with a ball-shaped embedding slot; the left part of the locking seat is configured with a lifting and lowering hole communicated with the ball-shaped embedding slot; the edge on the front side of the driving wheel is configured with an arched unlocking slot; the sidewall of the unlocking slot on the side adjacent to the lifting and lowering hole is tilted toward the lifting and lowering hole; a left side of the locking seat is located above the driving wheel to stop the driving wheel from jumping up; a locking steel ball is configured inside the lifting and lowering hole; the lower end of the locking steel ball abuts the top surface of the driving wheel; the upper end of the locking steel ball is embedded into the ball-shaped embedding slot; the left sidewall of the fixing part is configured with a fixing arm: a tension spring is connected between the fixing arm and the left part of the locking block.

More preferably, wherein the bottom of the rotating slot is configured with a limiting slot located on the upper opening of the rotating hole, the limiting slot is arch-shaped; the bottom surface of the driving wheel is configured with a limiting column matching the limiting slot.

More preferably, wherein a limiting washer is configured between the rotating boss and the top end of the third bolt, the outer diameter of the limiting washer is larger than the inner diameter of the locking block.

More preferably, wherein the nailing force adjusting device comprises a pushing plate configured on the end part of the long rocker, the location of the pushing plate corresponds to the location of the eccentric spindle, the pushing plate is located on the side of the long rocker away from the short rocker; the sidewall of the long rocker on the side facing the short rocker is configured with an adjusting plate; the adjusting plate is configured with an adjusting screw hole; the adjusting screw hole is screwed with an adjusting bolt; the sidewall of the short rocker on the side facing the long rocker is configured with an unlocking plate to match the location of the adjusting plate, one end of the adjusting bolt sticks out of the adjusting screw hole and abuts on the unlocking plate.

More preferably, wherein the end of the adjusting bolt abutting on the unlocking plate is semi-spherical.

More preferably, wherein the end of the adjusting bolt not abutting on the unlocking plate sticks out of the adjusting screw hole and is screwed with a fastening nut that abuts the adjusting plate.

More preferably, wherein the top surface of the power box is configured with a buckling slot that matches the location of the second bolt; a matching guiding plate is configured inside the buckling slot, the firing pin is located above the guiding plate and abuts the top surface of the guiding plate; the rear part of the guiding plate is protruded backward out of the buckling slot and covers the unlocking slot.

More preferably, wherein the left inner wall of the notch is configured with an arched guiding surface; and the left side of the locking part is configured with a sliding-out surface matching the guiding surface.

More preferably, wherein the front side of the end of the fixing part fixed by the first bolt is configured with a stopping block; the right sidewall of the locking block is configured with a limiting part abutting the stopping block.

Comparing to the prior art, the present invention has achieved the following benefits: The present invention uses the locking steel ball of the automatic unlocking device to limit the position of the locking block, instead of using the locking part of the locking block to press the locking part tightly inside the notch of the firing pin, thus effectively avoiding the problem of wear and tear of the locking part of the locking block, as well as the notch due to squeeze by external forces, and effectively ensuring accurate position of the firing pin when locked up by the locking part of the locking block. In this way, the nailing quality is guaranteed. When the firing pin is moved, the locking part of the locking block will be driven by the firing pin to move automatically out of the notch, achieving the effect of automatic unlocking. Moreover, the nailing force adjusting device can effectively adjust the collision force of the firing pin, thus realizing adjustment of the nailing force. Through the present invention, the electric nailing gun can satisfy different nailing requirements, without having to replace the whole driving motor. Therefore, the cost of use is effectively reduced.

DETAILED DESCRIPTION OF THE INVENTION

Figure 1:
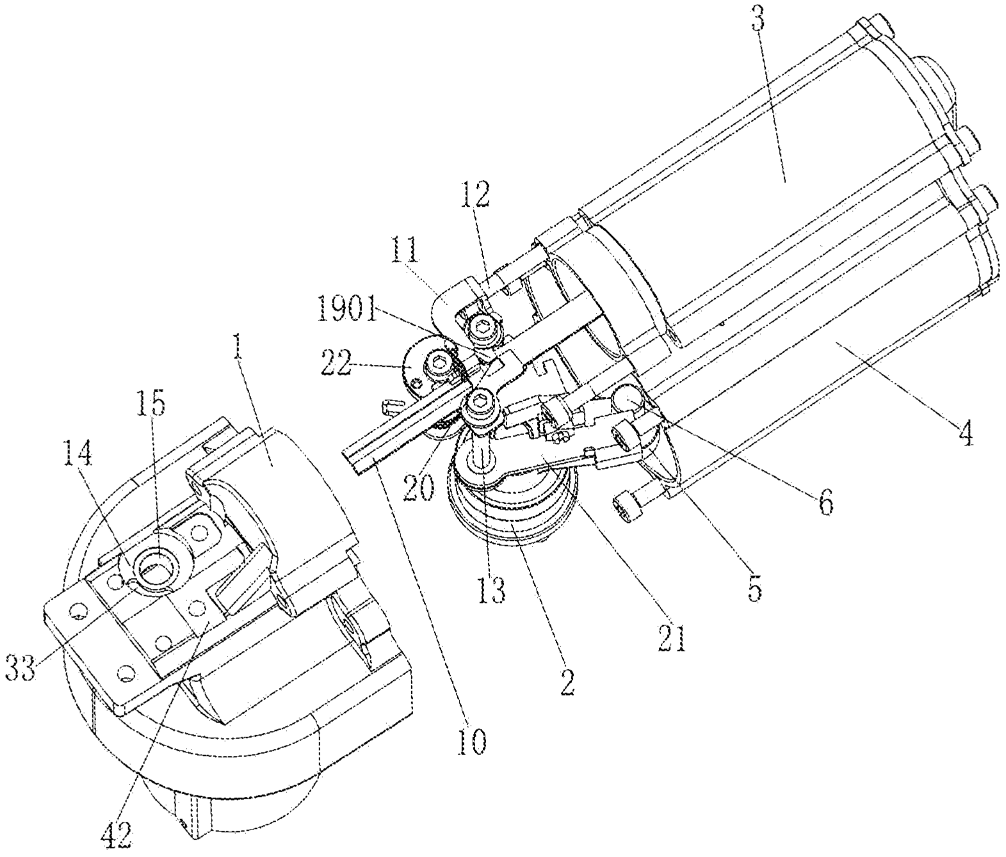
FIG. 1 is a structural perspective view of the locking device for adjusting the nailing force of an electric nailing gun according to the present invention.
Figure 2:
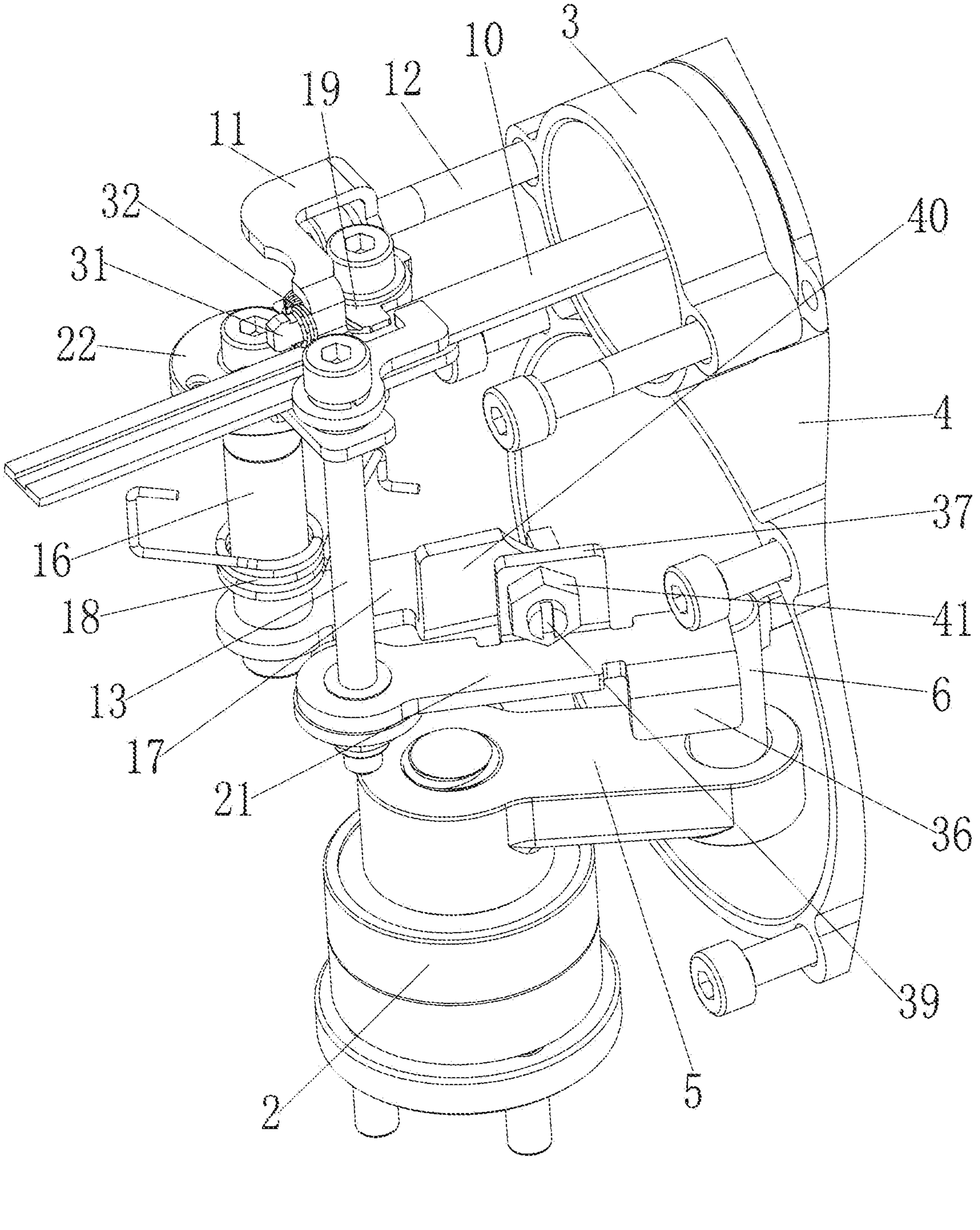
FIG. 2 is a partial structural view of the locking device for adjusting the nailing force.
Figure 3:
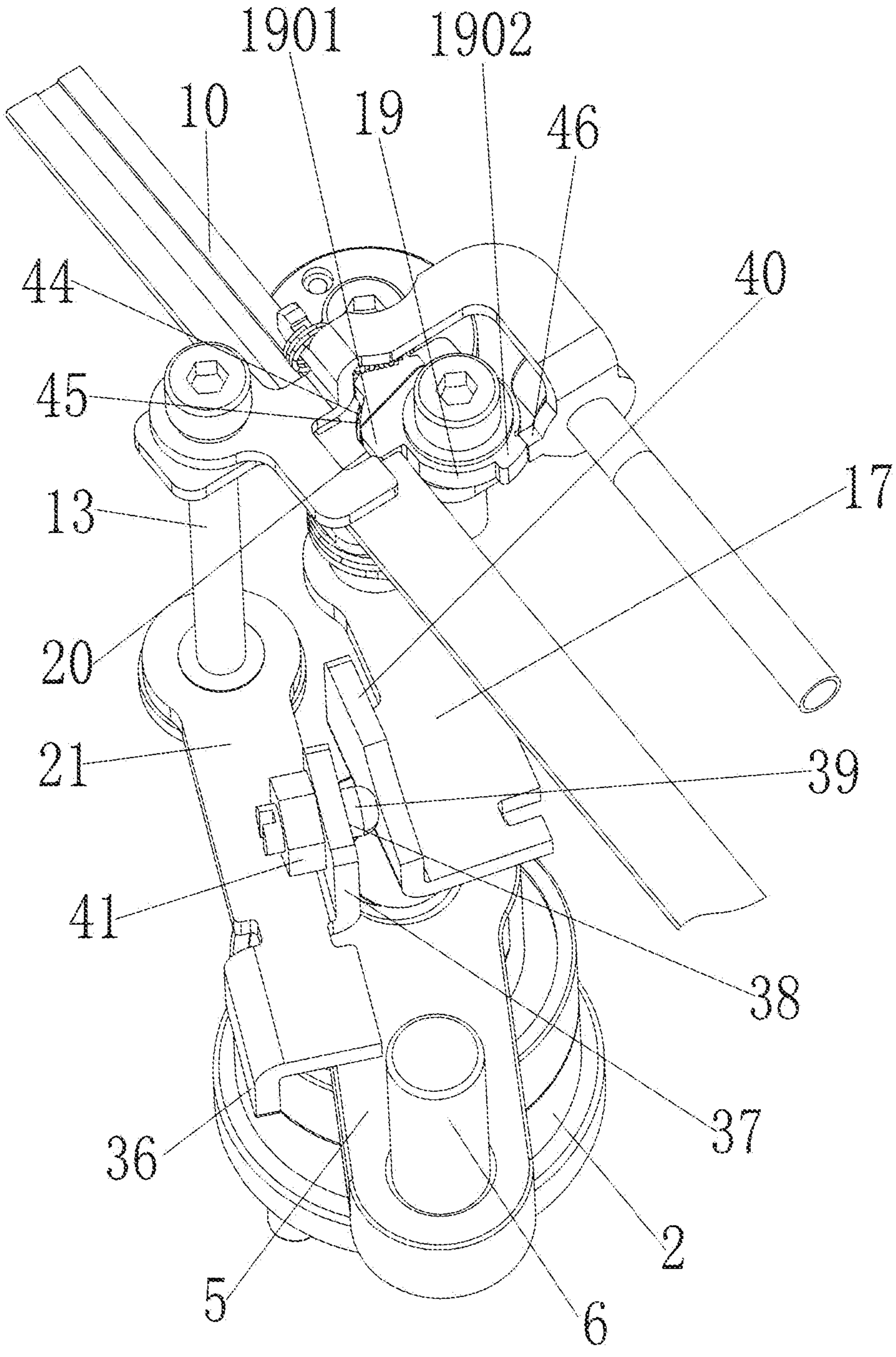
FIG. 3 is a structural view of the nailing force adjusting device from one perspective.
Figure 4:
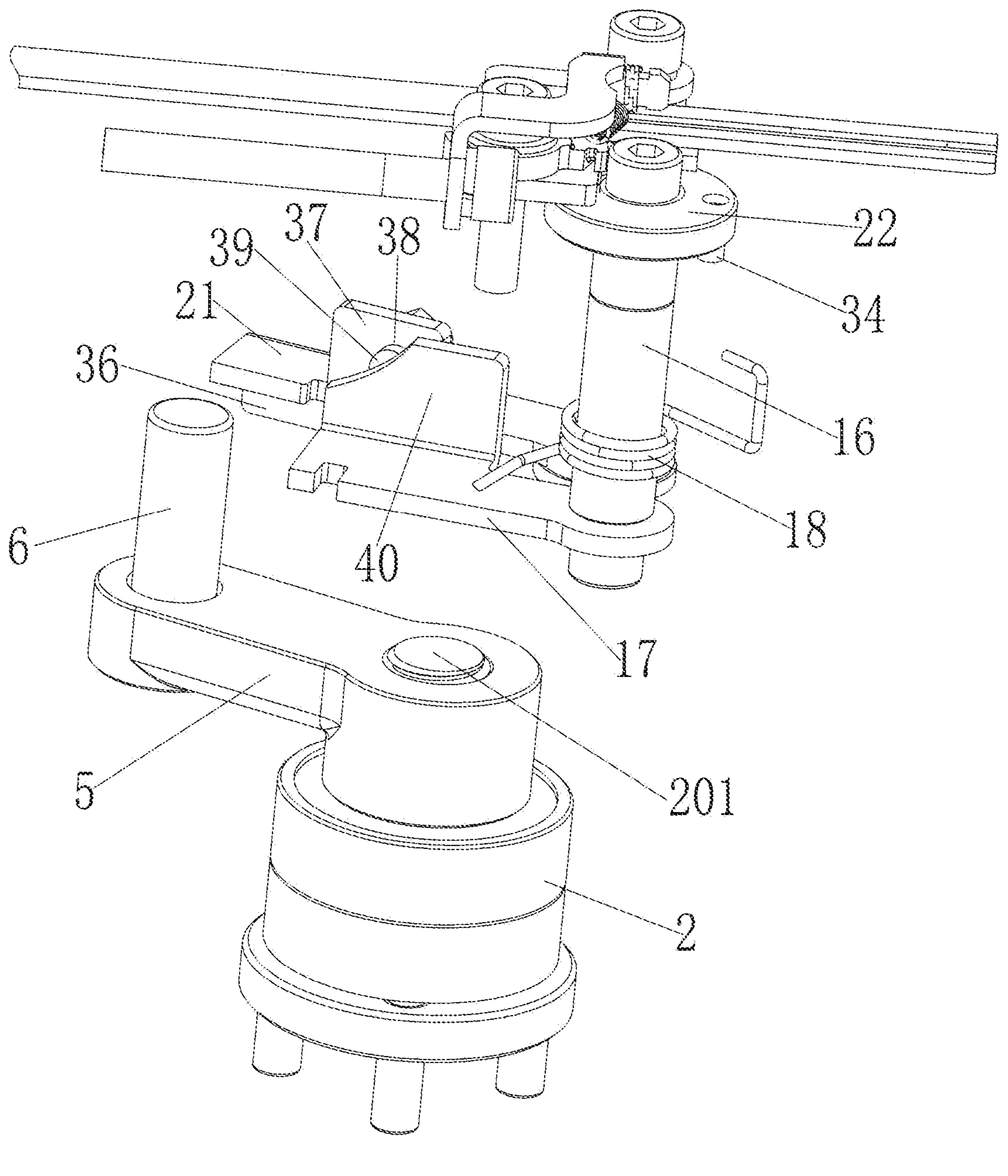
FIG. 4 is a structural view of the nailing force adjusting device from another perspective.
Figure 5:
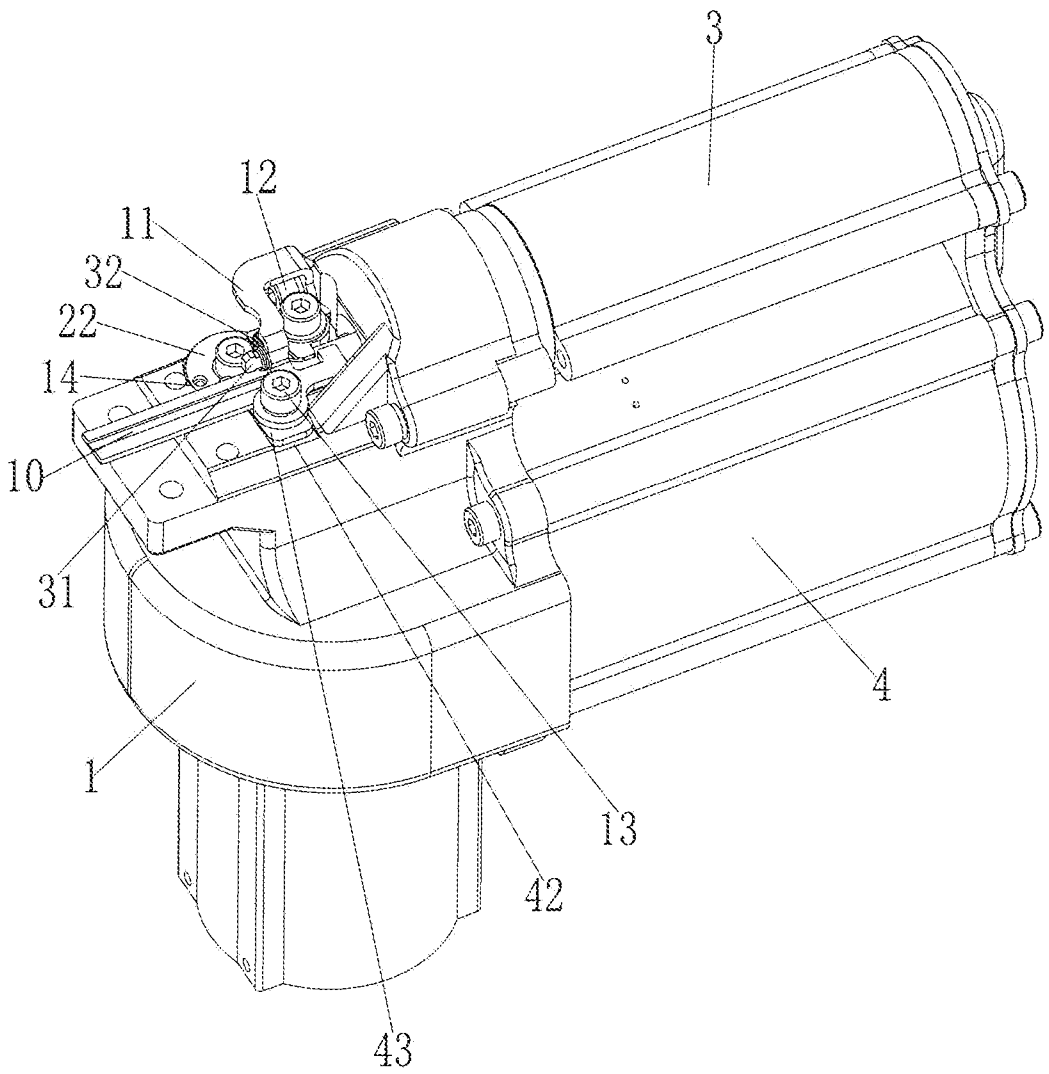
FIG. 5 is a perspective view of the locking device for adjusting the nailing force.
Figure 6:
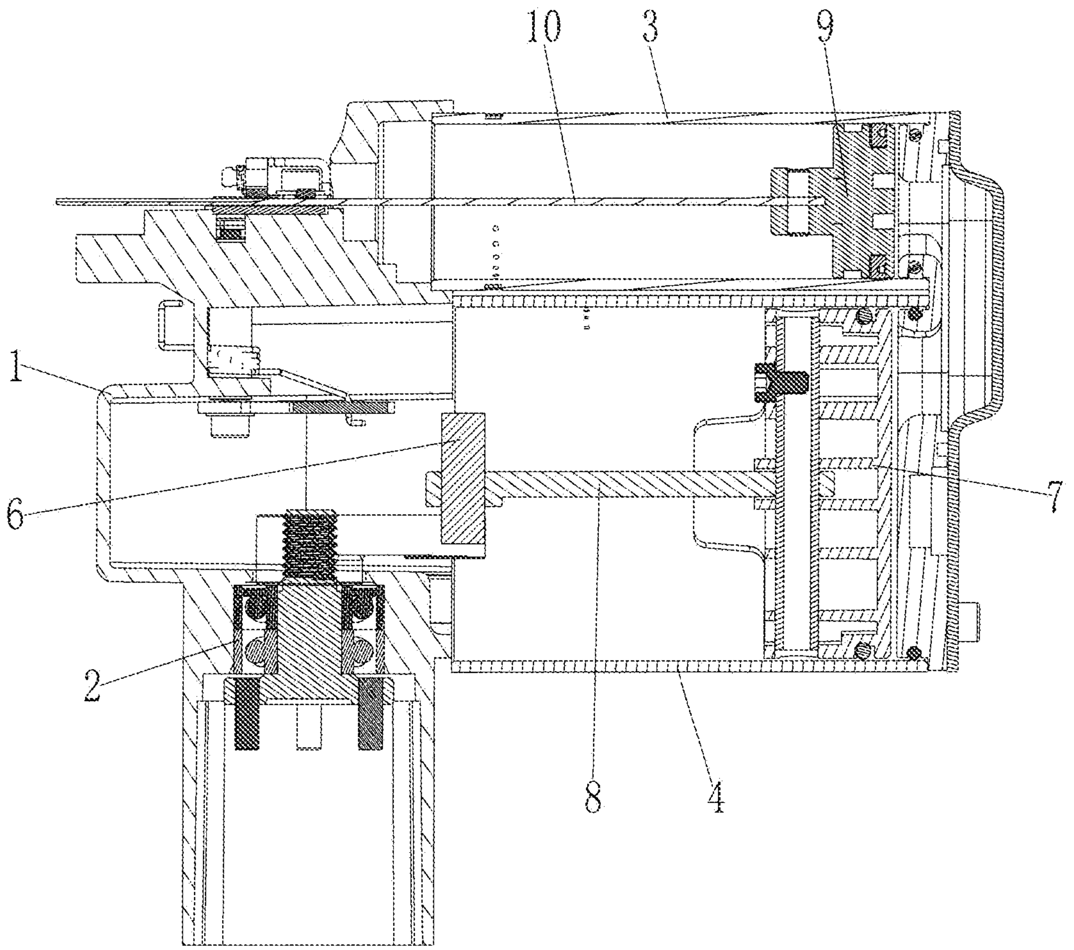
FIG. 6 is a sectional view of the locking device for adjusting the nailing force.
Figure 7:
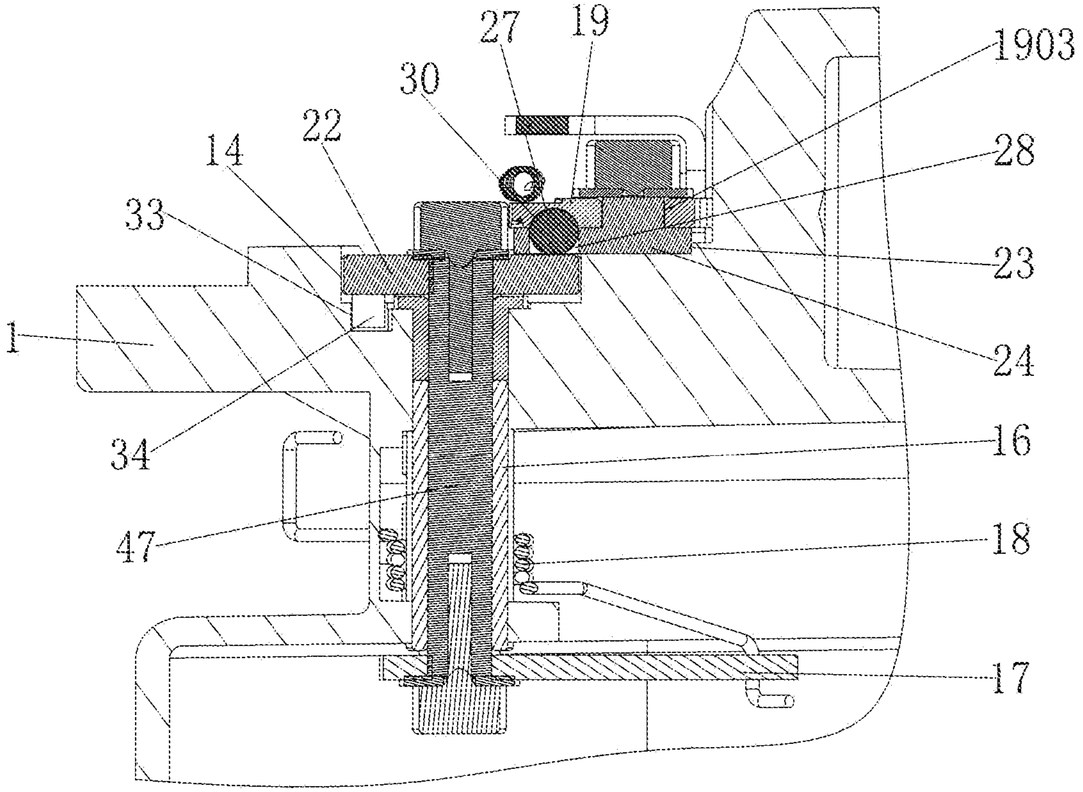
FIG. 7 is a partial sectional view of the locking device for adjusting the nailing force.
Figure 8:
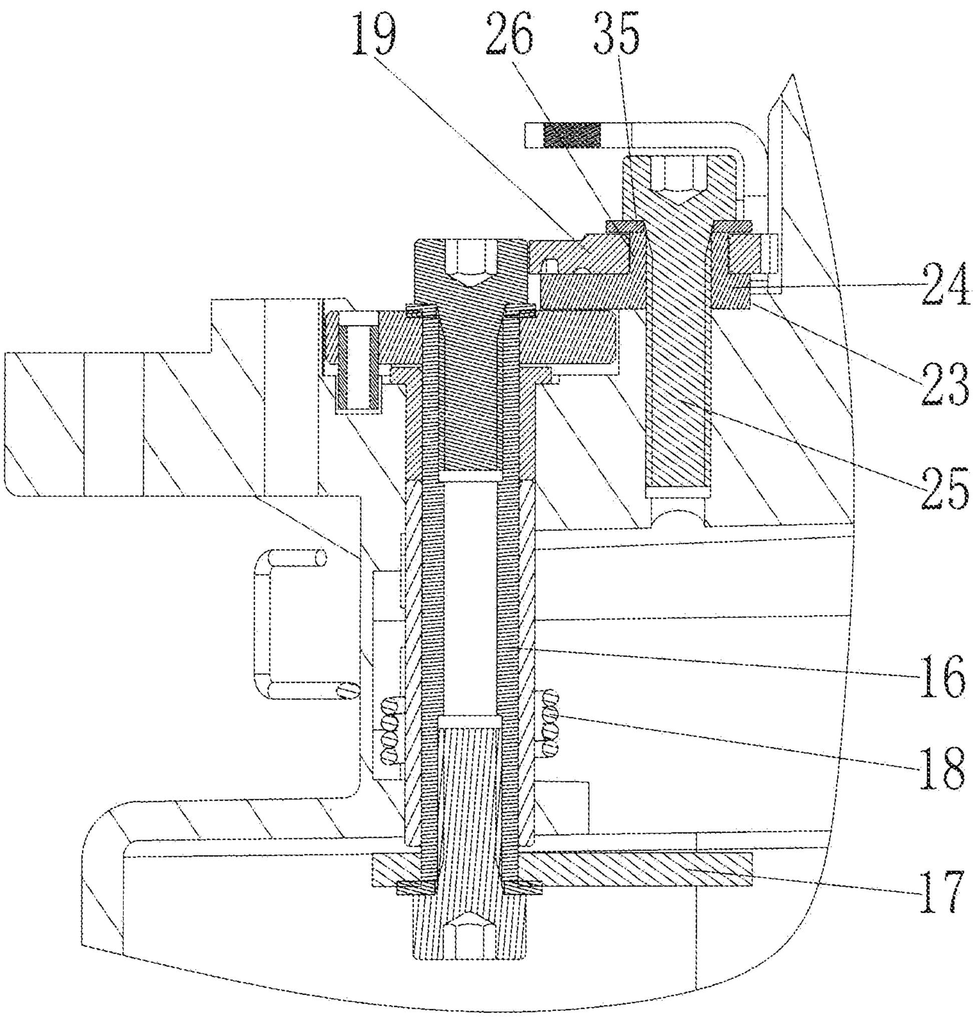
FIG. 8 is another partial sectional view of the locking device for adjusting the nailing force.
Figure 9:
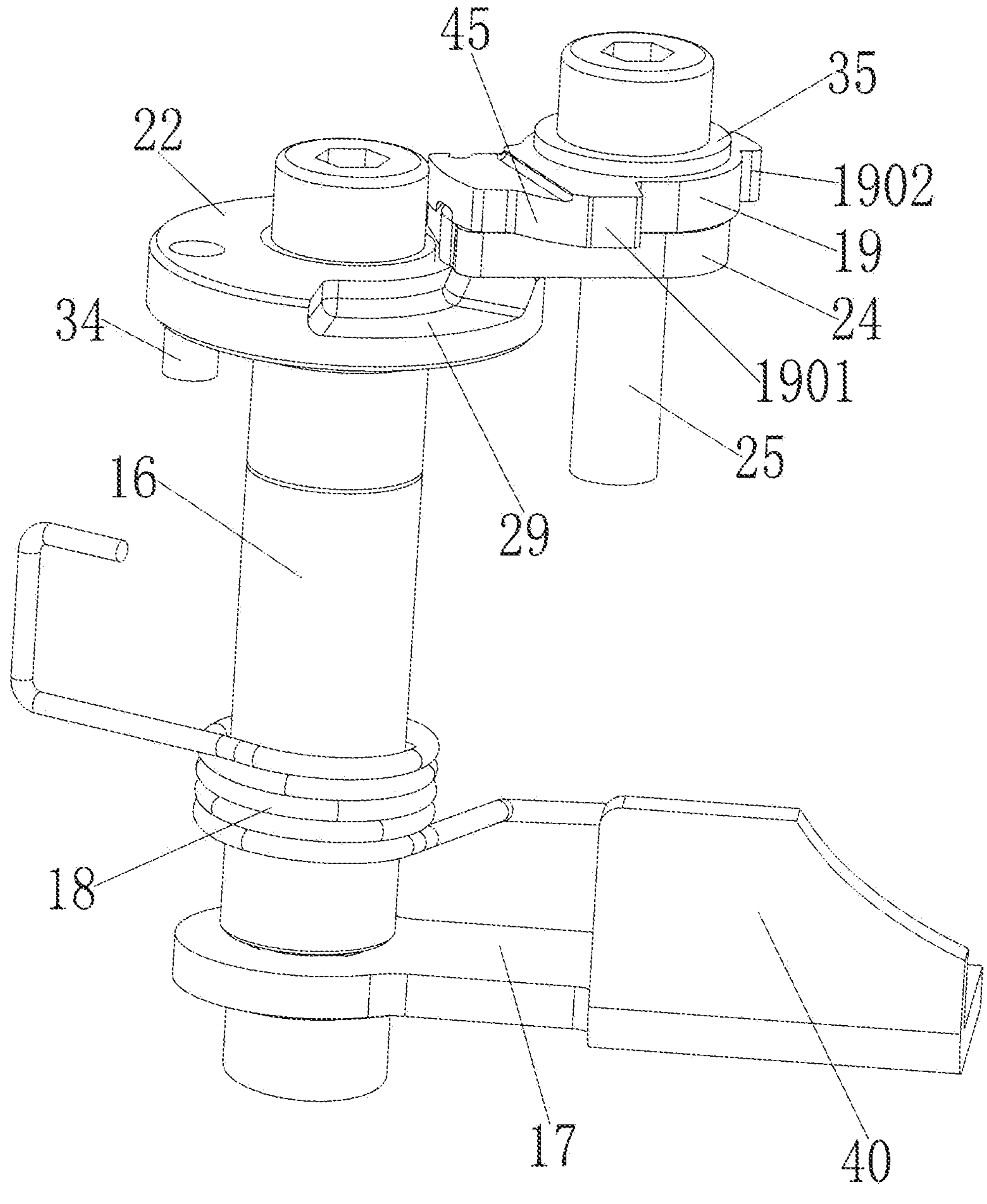
FIG. 9 is a structural view of the automatic unlocking device.

Referring to FIG. 1 to FIG. 9, the present invention provides a locking device for adjusting the nailing force of an electric nailing gun, which comprises a power box 1, a driving motor configured inside the power box 1, an upper cylinder 3 configured on the right side of the power box 1, and a lower cylinder 4 located right beneath the upper cylinder 3. The driving motor is connected to a connecting arm 5 through the reducing mechanism 2. The end part of the connecting arm 5 is configured with an eccentric spindle 6. A lower piston 7 is configured inside the lower cylinder 4. The lower piston 7 is hinged with a piston arm 8. The piston arm 8 is connected to the eccentric spindle 6. An upper piston 9 is configured inside the upper cylinder 3. The center of the left sidewall of the upper piston 9 is configured with a firing pin 10. The left end of the firing pin 10 sticks out of the upper cylinder 3. The left side of the upper cylinder 3 is configured with a fixing part 11 located above the power box 1. One end of the fixing part 11 is fixed on the upper cylinder 3 through a first bolt 12. The other end of the fixing part 11 is fixed on the power box 1 through a second bolt 13. The rear side of the top surface of the power box 1 is configured with a rotating slot 14. The bottom of the rotating slot 14 is configured with a rotating hole 15 communicated with the power box 1. A matching rotating bushing 16 is configured inside the rotating hole 15. A matching rotating spindle 47 is configured inside the rotating bushing 16. The lower end of the rotating spindle 47 sticks downward into the power box 1 and is configured with a short rocker 17. The rotating bushing 16 is sleeved with a torsion spring 18. One end of the torsion spring 18 is fixed on the short rocker 17. The other end of the torsion spring 18 is fixed on the inner wall of the power box 1. The upper end of the rotating spindle 47 is configured with an automatic unlocking device that matches the rotating slot 14. The right side of the automatic unlocking device is configured with a matching locking block 19. The sidewall of the firing pin 10 on the side facing the locking block 19 is configured with a notch 20. The locking block 19 is configured with a locking part 1901 that matches the notch 20. The lower end of the second bolt 13 sticks downward downward into the power box 1 and is hinged with a long rocker 21. The long rocker 21 is configured with a nailing force adjusting device that matches the short rocker 17.

The automatic unlocking device comprises a driving wheel 22 configured on the upper end of the rotating spindle 47. The driving wheel 22 is located inside the rotating slot 14. The top surface of the power box 1 is configured with a positioning slot 23 that is communicated with the rotating slot 14. The positioning slot 23 is located on the right side of the rotating slot 14. A matching locking seat 24 is configured inside the positioning slot 23. The locking seat 24 is fixed inside the positioning slot 23 through a third bolt 25. The top surface of the locking seat 24 is configured with a rotating boss 26. The locking block 19 is sleeved outside the rotating boss 26 via a movement hole 1903 configured at its center. The left side of the bottom surface of the locking block 19 is configured with a ball-shaped embedding slot 27. The left part of the locking seat 24 is configured with a lifting and lowering hole 28 that is communicated with the ball-shaped embedding slot 27. The edge of the front side of the driving wheel 22 is configured with an arched unlocking slot 29. The side of the unlocking slot 29 adjacent to the lifting and lowering hole 28 is tilted toward the lifting and lowering hole 28. The left side of the locking seat 24 is located above the driving wheel 22 and stops the driving wheel 22 from jumping upward. A locking steel ball 30 is configured inside the lifting and lowering hole 28. The lower end of the locking steel ball 30 abuts the top surface of the driving wheel 22. The upper end of the locking steel ball 30 is embedded into the ball-shaped embedding slot 27. The left sidewall of the fixing part 11 is configured with a fixing arm 31. A tension spring 32 is connected between the fixing arm 31 and the left part of the locking block 19.

The bottom of the rotating slot 14 is configured with a limiting slot 33 located on the side of the upper opening of the rotating hole 15. The limiting slot 33 is in an arched shape. The bottom surface of the driving wheel 22 is configured with a limiting column 34 that matches the limiting slot 33.

A limiting washer 35 is configured between the rotating boss 26 and the head part of the third bolt 25. The outer diameter of the limiting washer 35 is larger than the inner diameter of the locking block 19.

The nailing force adjusting device comprises a pushing plate 36 configured on the end part of the long rocker 21. The location of the pushing plate 36 matches that of the eccentric spindle 6. The pushing plate 36 is located on the side of the long rocker 21 away from the short rocker. The sidewall of the long rocker 21 facing the short rocker 17 is configured with an adjusting plate 37. The adjusting plate 37 is configured with an adjusting screw hole 38. The adjusting screw hole 38 is screwed with an adjusting bolt 39. The sidewall of the short rocker 17 facing the long rocker 21 is configured with an unlocking plate 40 that matches the location of the adjusting plate 37. One end of the adjusting bolt 39 sticks out of the adjusting screw hole 38 and abuts on the unlocking plate 40.

The end of the adjusting bolt 39 abutting on the unlocking plate 40 is semi-spherical.

The end of the adjusting bolt 39 not abutting on the unlocking plate 40 sticks out of the adjusting screw hole 38 and is screwed with a fastening nut 41 that abuts the adjusting plate 37.

The top surface of the power box 1 is configured with a buckling slot 42 that corresponds to the position of the second bolt 13. A matching guiding plate 43 is configured inside the buckling slot 42. The firing pin 10 is located above the guiding plate 43 and abuts on the top surface of the guiding plate 43. The rear part of the guiding plate 43 protrudes backward out of the buckling slot 42 and covers the unlocking slot 29.

The left inner wall of the notch 20 is configured with an arched guiding surface 44. The left side of the locking part 1901 is configured with a sliding-out surface 45 that matches the guiding surface 44.

The front side of the end of the fixing part 11 fixed by the first bolt 12 is configured with a stopping block 46. The right sidewall of the locking block 19 is configured with a limiting part 1902 that matches the stopping block 46.

The present invention is operated as follows:

To start operation of the electric nailing gun, firstly start the driving motor. When the driving motor is in operation, the reducing mechanism 2 will drive the connecting arm 5 to rotate, which will in turn drive the eccentric spindle 6 to rotate. The eccentric spindle 6 will rotate around the output spindle 201 of the reducing mechanism 2. Consequently, the eccentric spindle 6 will rotate to the front side of the pushing plate 36 of the long rocker 21, and collide with the pushing plate 36, pushing the pushing plate 36 backward. As the long rocker 21 is hinged on the lower end of the second bolt 13, when the pushing plate 36 is pushed backward, the long rocker 21 will turn backward around the second bolt 13. The adjusting bolt 39 screwed on the adjusting plate 37 of the long rocker 21 abuts the unlocking plate 40 of the short rocker 17. When the long rocker 21 rotates backward, the short rocker 17 will be pushed by the adjusting bolt 39 to rotate backward. As the short rocker 17 is fixed on the lower end of the rotating spindle 47, the rotating spindle 47 will rotate along with the short rocker 17. Now, the torsion spring 18 fitted outside the rotating bushing 16 will be deformed to accumulate elastic force through the pushing force of the short rocker 17.

The rotating spindle 47 rotates anti-clockwise under the drive of the short rocker 17. As the driving wheel is configured on the upper end of the rotating spindle 47, the driving wheel 22 will rotate anti-clockwise along with the rotating spindle 47. Now, the unlocking slot 29 on the front edge of the driving wheel 22 will move gradually toward the lifting and lowering hole. Firstly, the wall of the unlocking slot 29 on the side adjacent to the lifting and lowering hole 28 moves to the position beneath the lifting and lowering hole 28. As the sidewall of the unlocking slot 29 is tilted toward the lifting and lowering hole 28, the locking steel ball 30 originally inside the lifting and lowering hole 28 will slide into the unlocking slot 29 along the side of the unlocking slot 29 adjacent to the lifting and lowering hole 28. As the unlocking slot 29 is enclosed by the rotating slot 14, the locking steel ball 30 will be limited inside the unlocking slot 29, allowing it to move only inside the unlocking slot 29. When the locking steel ball 30 moves inside the unlocking slot 29, the top part of the locking steel ball 30 is remained inside the lifting and lowering hole 28. When the locking steel ball 30 moves from the lifting and lowering hole 28 into the unlocking slot 29, the top end of the locking steel ball 30 is no longer embedded inside the ball-shaped embedding slot 27 on the bottom surface of the locking block 19, and the locking steel ball 30 no longer limits the rotation of the locking block 19.

When the eccentric spindle 6 is rotated, the eccentric spindle 6 will drive the lower piston 7 to move through the piston arm 8, thus squeezing the gas inside the lower cylinder 4 into the upper cylinder 3 and increase the atmospheric pressure of the upper cylinder 3. The upper piston 9 will be pushed to move leftward. Now the upper piston 9 will drive the firing pin 10 to move leftward, and shoot the nail from the nailing channel of the electric nailing gun out of the nozzle of the electric nailing gun. Thus, the nailing is achieved. When the locking block 19 is not limited by the locking steel ball, along with the leftward movement of the firing pin 10, the firing pin 10 will transmit the leftward moving force to the locking part 1901 of the locking block 19 through the inner wall of the notch 20. When the locking part 1901 is pushed leftward, the locking block 19 will rotate around the rotating boss 26. The locking part 1901 of the locking block 19 will move away from the notch 20. The locking block 19 will no longer limit the movement of the firing pin 10 through the locking part 1901. As the fixing arm 31 of the fixing part 11 is fixed and cannot move, when the locking block 19 rotates clockwise, the tension spring 32 will be pulled to generate an elastic force. When the firing pin 10 completes the nailing action and is to be reset, the tension spring 32 will use its own elastic force to help the locking block 19 to reset, so that the locking part 1901 on the locking block 19 is again embedded into the notch 20. The tension spring 32 only helps the locking block 19 to reset and cannot use its own elastic force to press the locking part 1901 of the locking block 19 tightly inside the notch 20. Thus, the problem of wear and tear due to the tight elastic pressure of the locking part 1901 of the locking block 19 upon the notch 20.

When the locking block 19 is reset, the short rocker 17 will be reset under the elastic force of the torsion spring 18, driving the rotating spindle 47 to reset. When the rotating spindle 47 is reset, the driving wheel 22 is reset. Now, the driving wheel 22 rotates clockwise. The unlocking slot 29 on the driving wheel 22 gradually moves forward, and the locking steel ball 30 will move inside the lifting and lowering hole 28, and finally moves to the sidewall of the unlocking slot 29 originally adjacent to the lifting and lowering hole. As the side wall of the slot is tilted toward the lifting and lowering hole 28, the locking steel ball 30 will move along the tilted slot wall, through the lifting and lowering hole 28 toward the locking block 19. The locking steel ball 30 moves to the bottom surface of the locking block 19 and contacts with it. Now the driving wheel 22 is stopped and reset. The locking part 1901 on the locking block 19 contacts the sidewall 19 of the firing pin 10. When the notch 20 is reset and withdrawn to the locked position 1901, the locking part 1901 on the locking block 19 continues to move anti-clockwise under the pushing force of the tension spring 32, and then move right into the notch 20. The locking steel ball 30 originally positioned on the upper part of the lifting and lowering hole 28 is again embedded into the ball-shaped embedding slot 27 on the bottom surface of the locking block 19. The driving wheel 22 is fully reset. The top surface of the driving wheel 22 abuts the steel ball 30, and the locking block 19 is in a locked state to stop the rotation of the locking block 19. Now, the firing pin 10 continues to withdraw till the guiding surface 44 on the firing pin 10 touches the sliding-out surface 45 of the locking block 19, and the withdrawal of the firing pin 10 is completely stopped. Thus, the locking block 19 can limit the firing pin 10, and stop the withdrawal of the firing pin 10. The firing pin 10 will not withdraw further to collide with the main body of the upper cylinder 3 to cause damage of the upper cylinder 3. When the driving wheel 22 is reset, the top surface of the driving wheel 22 presses the locking steel ball 30 tightly inside the ball-shaped embedding slot 27, and the locking part 1901 of the locking block 19 can effectively keep the stability of the firing pin 10 in the locked state.

To adjust the nailing force, the user can rotate the adjusting bolt 39, so that the adjusting bolt 39 moves forward or backward along the threaded path of the adjusting screw hole 38, so as to adjust the distance between the adjusting plate 37 on the long rocker 21 and the unlocking plate 40 on the short rocker 17 to change the position of the pushing plate 36 on the long rocker 21. The larger the distance between the adjusting plate 37 and the unlocking plate 40 is, the further forward will the pushing plate 36 on the end of the long rocker 21 move, and the earlier the rotating eccentric spindle 6 will push the pushing plate 36, so that the firing pin 10 can be released earlier from the locking block 19. The earlier the locking block 19 is unlocked, the less resistance will the locking part 1901 of the locking block 19 exert to the firing pin 10. The later the locking block 19 is unlocked, the more resistance will the locking part 1901 of the locking block 19 exert to the firing pin 10. The stronger force the firing pin 10 receives, the stronger force will the firing pin 10 exert when shooting the nail. In this way, the nailing force can be adjusted.

To conclude, the present invention uses a locking steel ball of the automatic unlocking device 30 to limit the position of the locking block 19, instead of using the elastic force of a spring to press the locking part 1901 of the locking block 19 tightly inside the notch 20 of the firing pin 10, and thus can effectively avoid wear and tear of the locking part 1901 of the locking block 19 as well as the notch 20 resulting from the pressure of an external force. In this way, during the locked state, the position of the firing pin 10 can be accurately kept by the locking part 1901 of the locking block 19, and the subsequently nailing quality can be guaranteed. During the movement of the firing pin 10, the locking part 1901 of the locking block 19 will be driven by the firing pin 10 to move out of the notch 20 automatically, achieving the effect of automatic unlocking. Moreover, the nailing force adjusting device can effectively adjust the collision force of the firing pin 10, so as to adjust the nailing force. In this way, the electric nailing gun can satisfy different nailing requirements without having to change the whole driving motor, and the cost of use can be effectively reduced.

The bottom of the rotating slot 14 is configured with a limiting slot 33 located on the side of the top opening of the rotating hole 15. The limiting slot 33 is in an arched shape. The bottom surface of the driving wheel 22 is configured with a limiting column 34 to match the limiting slot 33. The limiting column 34 can ensure that the driving wheel 22 can be reset accurately along the limiting slot 33.

A limiting washer 35 is configured between the rotating boss 26 and the third bolt 25. The outer diameter of the limiting washer 35 is larger than the inner diameter of the locking block 19. Such a configuration can ensure that the locking block 19 can rotate stably around the rotating boss 26.

The end of the adjusting bolt 39 not abutting the unlocking plate 40 sticks out of the adjusting screw hole 38 and is screwed with a fastening nut 41 that abuts the adjusting plate 37. The fastening nut 41 can effectively enhance the stability of the adjusting bolt 39.

The top surface of the power box 1 is configured with a buckling slot 42 to match the position of the second bolt 13. A matching guiding plate 43 is configured inside the buckling slot 42. The firing pin 10 is located above the guiding plate 43 and abuts the top surface of the guiding plate 43. The rear part of the guiding plate 43 is protruded backward out of the buckling slot 42 and covers the unlocking slot 29. The guiding plate 43 provides guiding for the firing pin 10, and can improve the stability of the firing pin 10 during movement.

The left inner wall of the notch 20 is configured with an arched guiding surface 44. The left side of the locking part 1901 is configured with a sliding-out surface 45 that matches the guiding surface 44. The coordination between the guiding surface 44 and the sliding-out surface 45 can allow the locking part 1901 of the locking block 19 to move more smoothly out of the notch 20 when pushed by the firing pin 10.

The front side of the end of the fixing part 11 fixed by the first bolt 12 is configured with a stopping block 46. The right sidewall of the locking block 19 is configured with a limiting part 1902 abutting the stopping block 46. The stopping block 46 uses the limiting part 1902 to limit the position of the locking block 19, thus avoiding collision between the locking block 19 and the notch 20 when the elastic force is excessive.

We claim:

1. A locking device for adjusting the nailing force of an electric nailing gun, comprising a power box, a driving motor provided in the power box, and upper and lower cylinders arranged on a right side of the power box, the lower cylinder located below the upper cylinder, wherein the driving motor is connected with a connecting arm through a reducing mechanism, an end part of the connecting arm is configured with an eccentric spindle, a lower piston is provided inside the lower cylinder, the lower piston is hinged with a piston arm, the piston arm is connected to the eccentric spindle, an upper piston is configured inside the upper cylinder, the center of a left sidewall of the upper piston is configured with a firing pin, a left end of the firing pin sticks out of the upper cylinder, a left side of the upper cylinder is configured with a fixing part located above the power box, one end of the fixing part is connected to the upper cylinder via a first bolt and a second bolt, a rear side of a top surface of the power box is configured with a rotating slot, a bottom of the rotating slot is configured with a rotating hole communicated to an internal space of the power box, a matching rotating bushing is configured the rotating hole, a matching rotating spindle is configured inside the rotating bushing, the lower end of the rotating spindle sticks downward into the power box and is configured with a short rocker, the rotating bushing is sleeved with a torsion spring, one end of the torsion spring is fixed on the short rocker, the other end of the torsion spring is fixed on the inner wall of the power box, the upper end of the rotating spindle is configured with an automatic unlocking device that matches the rotating slot, the right side of the automatic unlocking device is configured with a matching locking block, the sidewall of the firing pin on the side facing the locking block is configured with a notch, the locking block is configured with a locking part matching the notch, the lower end of the second bolt sticks into the internal space of the power box and is hinged with a long rocker, the long rocker is configured with a nailing force adjusting device matching the short rocker-;

wherein the automatic unlocking device comprises a driving wheel configured on the upper end of the rotating spindle, the driving wheel being located inside the rotating slot; the top surface of the power box is configured with a positioning slot communicated with the rotating slot, the positioning slot being located on the right side of the rotating slot; a locking seat is configured inside the positioning slot, the locking seat being fixed inside the positioning slot via a third bolt; the top surface of the locking seat is configured with a rotating boss; the locking block is sleeved outside the rotating boss via the movement hole configured at its center; the left bottom surface of the locking block is configured with a ball-shaped embedding slot; the left part of the locking seat is configured with a lifting and lowering hole communicated with the ball-shaped embedding slot; the edge on the front side of the driving wheel is configured with an arched unlocking slot; the sidewall of the unlocking slot on the side adjacent to the lifting and lowering hole is tilted toward the lifting and lowering hole; a left side of the locking seat is located above the driving wheel to stop the driving wheel from jumping up; a locking steel ball is configured inside the lifting and lowering hole; the lower end of the locking steel ball abuts the top surface of the driving wheel; the upper end of the locking steel ball is embedded into the ball-shaped embedding slot; the left sidewall of the fixing part is configured with a fixing arm; a tension spring is connected between the fixing arm and the left part of the locking block.

2. The locking device for adjusting the nailing force of an electric nailing gun according to claim 1, wherein the bottom of the rotating slot is configured with a limiting slot located on the upper opening of the rotating hole, the limiting slot is arch-shaped; the bottom surface of the driving wheel is configured with a limiting column matching the limiting slot.

3. The locking device for adjusting the nailing force of an electric nailing gun according to claim 2, wherein a limiting washer is configured between the rotating boss and the top end of the third bolt, the outer diameter of the limiting washer is larger than the inner diameter of the locking block.

4. The locking device for adjusting the nailing force of an electric nailing gun according to claim 1, wherein the nailing force adjusting device comprises a pushing plate configured on the end part of the long rocker, the location of the pushing plate corresponds to the location of the eccentric spindle, the pushing plate is located on the side of the long rocker away from the short rocker; the sidewall of the long rocker on the side facing the short rocker is configured with an adjusting plate; the adjusting plate is configured with an adjusting screw hole; the adjusting screw hole is screwed with an adjusting bolt; the sidewall of the short rocker on the side facing the long rocker is configured with an unlocking plate to match the location of the adjusting plate, one end of the adjusting bolt sticks out of the adjusting screw hole and abuts on the unlocking plate.

5. The locking device for adjusting the nailing force of an electric nailing gun according to claim 4, wherein the end of the adjusting bolt abutting on the unlocking plate is semi-spherical.

6. The locking device for adjusting the nailing force of an electric nailing gun according to claim 4, wherein the end of the adjusting bolt not abutting on the unlocking plate sticks out of the adjusting screw hole and is screwed with a fastening nut that abuts the adjusting plate.

7. The locking device for adjusting the nailing force of an electric nailing gun according to claim 1, wherein the top surface of the power box is configured with a buckling slot that matches the location of the second bolt; a matching guiding plate is configured inside the buckling slot, the firing pin is located above the guiding plate and abuts the top surface of the guiding plate; the rear part of the guiding plate is protruded backward out of the buckling slot and covers the unlocking slot.

8. The locking device for adjusting the nailing force of an electric nailing gun according to claim 1, wherein the left inner wall of the notch is configured with an arched guiding surface; and the left side of the locking part is configured with a sliding-out surface matching the guiding surface.

9. The locking device for adjusting the nailing force of an electric nailing gun according to claim 1, wherein the front side of the end of the fixing part fixed by the first bolt is configured with a stopping block; the right sidewall of the locking block is configured with a limiting part abutting the stopping block.

* * * * *